(12) United States Patent
Zhan et al.

(10) Patent No.: US 10,105,866 B2
(45) Date of Patent: Oct. 23, 2018

(54) METHOD FOR PREPARING FUNCTIONAL ENGINEERED WOOD

(71) Applicant: Dehua TB New Decoration Material Co., Ltd., Huzhou (CN)

(72) Inventors: Xianxu Zhan, Zhejiang Province (CN); Yan Zhuo, Zhejiang Province (CN); Yong Yang, Zhejiang Province (CN); Guoqing Peng, Zhejiang Province (CN); Jinxiang Shen, Zhejiang Province (CN); Xiaowei Zhang, Zhejiang Province (CN); Yuanqiang Liu, Zhejiang Province (CN); Xuqin Xie, Zhejiang Province (CN); Mingjuan Cheng, Zhejiang Province (CN)

(73) Assignee: Dehua TB New Decoration Material Co., Ltd., Huzhou, Zhenjian Province (CN)

( * ) Notice: Subject to any disclaimer, the term of this patent is extended or adjusted under 35 U.S.C. 154(b) by 333 days.

(21) Appl. No.: 15/052,860

(22) Filed: Feb. 24, 2016

(65) Prior Publication Data

US 2017/0239836 A1    Aug. 24, 2017

(51) Int. Cl.

| | |
|---|---|
| *B27K 3/52* | (2006.01) |
| *B27K 3/02* | (2006.01) |
| *B27K 5/02* | (2006.01) |
| *B27N 3/00* | (2006.01) |
| *C09J 161/32* | (2006.01) |
| *B27N 9/00* | (2006.01) |
| *B27N 3/18* | (2006.01) |
| *B27L 5/00* | (2006.01) |
| *B05D 7/06* | (2006.01) |
| *B27K 3/15* | (2006.01) |
| *B27K 3/40* | (2006.01) |
| *B27K 5/00* | (2006.01) |

(52) U.S. Cl.
CPC ............... *B27K 3/52* (2013.01); *B05D 7/06* (2013.01); *B27K 3/0207* (2013.01); *B27K 3/0278* (2013.01); *B27K 3/15* (2013.01); *B27K 3/40* (2013.01); *B27K 5/001* (2013.01); *B27K 5/007* (2013.01); *B27K 5/02* (2013.01); *B27L 5/00* (2013.01); *B27N 3/002* (2013.01); *B27N 3/18* (2013.01); *B27N 9/00* (2013.01); *C09J 161/32* (2013.01)

(58) Field of Classification Search
CPC ....... B27K 5/02; B27L 5/00; Y10T 156/1052; Y10T 156/1062
See application file for complete search history.

(56) References Cited

U.S. PATENT DOCUMENTS

| 3,840,388 A | * | 10/1974 | Perlus | ............... B27K 3/0214 |
| | | | | 156/281 |
| 4,784,887 A | * | 11/1988 | Abendroth | ........... B27M 3/0053 |
| | | | | 428/54 |
| 5,034,259 A | * | 7/1991 | Barker | ..................... B27B 1/00 |
| | | | | 144/332 |
| 2016/0024354 A1 | * | 1/2016 | Winterowd | ............. C08L 97/02 |
| | | | | 524/14 |
| 2016/0225692 A1 | * | 8/2016 | Kim | .................. H01L 23/49827 |

* cited by examiner

*Primary Examiner* — Mark A Osele
*Assistant Examiner* — Christopher C Caillouet
(74) *Attorney, Agent, or Firm* — NK Patent Law

(57) ABSTRACT

The present invention relates to furniture panels, and more particularly, to a method for preparing functional engineered wood. It includes the following steps: make veneer blanks by rotary cutting or splicing, and cut the veneer blanks into desired dimensions to obtain veneers A. Soak the veneers A in a ternary mixed solution of a biomass nanocellulose solubilizer, a fire retardant and an acid dye for toughening, fire retardation and dyeing to obtain veneers B. Add a formaldehyde decomposing powder into a modified MUF adhesive, mix them up, coat the veneers B with the mixture to obtain veneers C. Assemble and cold-press the veneers C to obtain flitches D, and saw the flitches D into desired patterns and dimensions to obtain finished products.

10 Claims, No Drawings

METHOD FOR PREPARING FUNCTIONAL ENGINEERED WOOD

BACKGROUND OF THE INVENTION

1. Technical Field

The present invention relates to furniture panels, and more particularly, to a method for preparing functional engineered wood.

2. Description of Related Art

Multilaminar decorative lumber has its origin in the United Kingdom and Italy of the 1930s and its main purpose is to slice logs into veneers. In the 1960s, Italy and the United Kingdom developed a method for manufacturing artificial veneers with flitches that are obtained by wet-bonding and cold-pressing veneers in a certain way that are peeled from general trees, bleached and dyed. In early 1970s, companies such as Italian Alpi and IPir as well as Japanese Panasonic Electric Works realized the industrial production of engineered wood and set up a research and development center for engineered wood, which was engaged in the research and development of the production process and technologies of engineered wood. In early 1980s, China entered the industry of engineered wood. In recent three decades, Italy and Japan carried out many researches in and industrial development of equipment and products for manufacturing engineered wood. Engineered wood has been expanded from the original decorative veneers to sawing-grade lumber, composite floors, outdoor wooden structures, and to a variety of arts and crafts, articles for daily use as well as stationery and sports goods. As a new renewable environmental protection material, engineered wood has penetrated into every aspect of people's life.

At present, functionalization is an important development direction of multilaminar decorative lumber. CN103171014B (2015 Apr. 15) disclosed a method for preparing engineered wood, but the formaldehyde emission of the engineered wood is high, and the coloring agent is not weatherproof. It is difficult to penetrate and poorly compatible with water-based adhesives, easily vanishes and causes severe environmental pollution in dyeing. Additionally, the engineered wood is not treated for fire retardation since fire retardants will affect the color development of coloring agents and gluing of the interfaces of dyed veneers, so the functionality is to be improved.

BRIEF SUMMARY OF THE INVENTION

The aim of the present invention is to provide a method for preparing functional engineered wood that can solve the problem above.

The technical aim of the present invention above is achieved through the following technical solution:

A method for preparing functional engineered wood, characterized in that, including the following steps:
(1) make veneer blanks by rotary cutting or splicing, and cut the veneer blanks into desired dimensions to obtain veneers A;
(2) soak the veneers A in a ternary mixed solution of a biomass nanocellulose solubilizer, a fire retardant and an acid dye for toughening, fire retardation and dyeing to obtain veneers B;
(3) add a formaldehyde decomposing powder into a modified MUF adhesive, mix them up, coat the veneers B with the mixture to obtain veneers C;
(4) assemble and cold-press the veneers C to obtain flitches D, and saw the veneers D into desired patterns and dimensions to obtain finished products.

The present invention effectively solves the multi-component mixing of a fire retardant, a coloring agent and an adhesive through the interface control design, the biomass nanotechnology and the synergistic-effect mixing process and obtains a manufacturing method that integrates multiple functions in one multilaminar decorative lumber. The present invention develops a high-fastness ternary mixed dye, a modified MUF adhesive, a new synergistic impregnation and fire retardation process, and a weather-resistant, high-efficiency fire-retarding and smoke-suppressing multilaminar decorative lumber through research in the light sensitive, temperature sensitive and humidity sensitive characteristics of the multilaminar decorative lumber, the color changing mechanism of traditional dyes and the fire retardation mechanism. The formaldehyde and VOC emissions of the multilaminar decorative lumber according to the present invention is low, the formaldehyde scavenging efficiency is over 75% and the persistence of the formaldehyde scavenging effect is over 60%. The coloring agent is weather-resistant and well compatible with water-based adhesives, easily penetrates but not easily vanishes, and a bioenvironmental protection dye is used, greatly reducing pollution. In addition, the function of fire retardation is included in the modified MUF adhesive to allow the modified MUF adhesive and the ternary mixed solution to have a good mixing synergic effect.

Preferably, the preparation method of the modified MUF adhesive in Step (3) is as below:
A. feed 100 parts by weight of formaldehyde aqueous solution with a mass concentration of 36.5-37.4 wt %, 0.1~0.5 parts by weight of alkaline substance solution with a mass concentration of 30-50 wt % and 0.3~0.6 parts by weight of amino-terminated hyperbranched polymer PAMAM into a reaction kettle, and start the kettle to begin stirring.
B. add 1~4 parts of phosphonitrilic chloride trimer, raise the temperature to 50~55° C., allow the temperature to rise naturally to 75~85° C., add 35~55 parts of melamine, raise the temperature to 90-95° C., and allow them to react to obtain primary condensation polymers;
C. add 40~45 parts of melamine in the primary condensation polymers above, and add 0.6~0.9 parts of para toluene sulfonamide, to obtain second condensation polymers;
D. cool the second condensation polymers to 70~75° C., add 20~30 parts of urea, allow reaction for 8~12 min, cool to 30~50° C. and then take out the adhesive.

The present invention adopts modification of para toluene sulfonamide and amino-terminated hyperbranched polymer PAMAM where urea, melamine and formaldehyde are fed several times by stages, which maximizes the content of intermediates of the modified MUF resin adhesive during preparation, improving the strength and wear resistance and prolonging the useful life of the lumber. A number of active functional groups in the molecules of amino-terminated hyperbranched polymer PAMAM and the high degree of branching of the structure thereof are utilized to modify the MUF resin to improve the properties and stability of the resin and effectively control the release of free formaldehyde. The formaldehyde emission of the engineered wood treated by the modified MUF adhesive according to the present invention is less than 0.2 mg/L, which conforms to Japanese standard F☆☆☆☆;

In addition, the present invention uses urea, melamine and formaldehyde as matrices, utilizes the activity of the P—Cl bonds in phosphonitrilic chloride trimer that Cls are easily replaced so as to produce a series of phosphazene compounds through substitution reaction (see equation I), such as nucleophilic substitution reaction with urea, and adds the products into the matrices for condensation polymerization to introduce phosphazene groups (see equation II). The phosphazene group is a stable six-membered ring and exists in a ring structure or linear structure with alternating P—N single and double bonds. By virtue of the synergistic effect between phosphorus and nitrogen, that is, phosphorus has the same endothermic effect as metaphosphoric acid and nitrogen can dilute oxygen like inert gases, the modified MUF adhesive has good high temperature resistance and fire retardation effects, and emits less smoke and toxic gases, environmentally fire retarding.

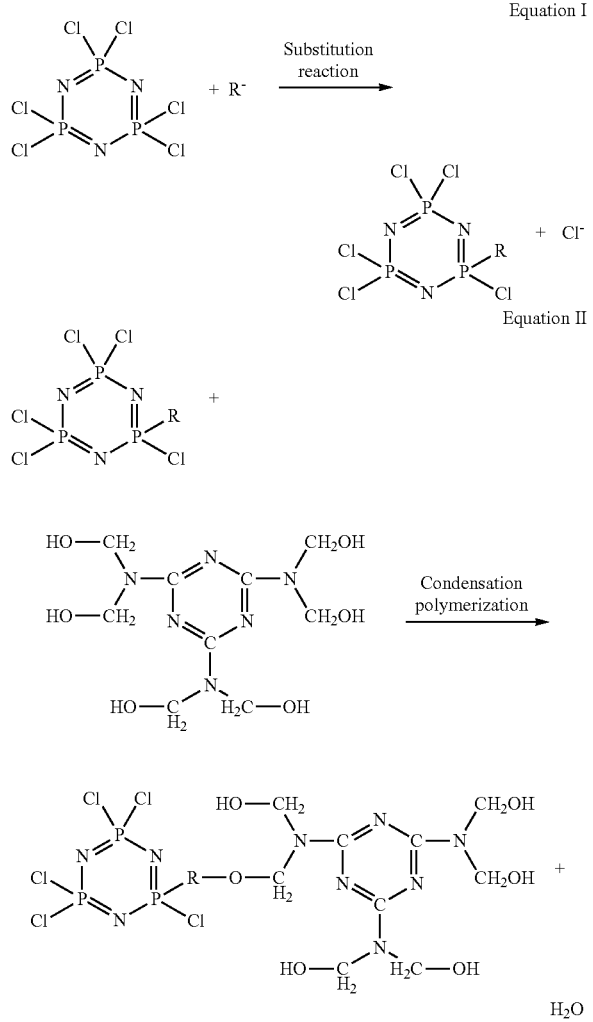

More preferably, the alkaline substance in Step A of the preparation method of the modified MUF adhesive is sodium hydroxide, potassium hydroxide, calcium hydroxide, barium hydroxide or ammonia water.

Preferably, the formaldehyde decomposing powder in Step (3) comprises chitin, nano-silicon slices and tourmaline powders; the tourmaline powder is 0-5 wt % by weight of the formaldehyde decomposing powder.

The effective constituents used for decomposing formaldehyde in the present invention are biomass materials such as polymers with amino, nanomaterials and tourmaline powders, toxic, harmless and ensuring a safe production environment. The lumber treated by the formaldehyde decomposing powder according to the present invention has the function of absorbing and decomposing formaldehyde on the surface, purifying the air and improving the environmental quality indicators. The formaldehyde scavenging efficiency is over 75% and the persistence of the formaldehyde scavenging effect is over 60%.

Preferably, the ternary mixed solution in Step (2) is prepared by mixing a biomass nanocellulose solubilizer, a fire retardant and an acid diazo dye compound solutions in the proportion of 1:25-40:100-300 (by mass);

The preparation of the biomass nanocellulose solubilizer: add 1~3 parts by weight of bamboo leaf flavonoids, 0.5~0.8 parts by weight of β-cyclodextrin and peppermint oil micro powders and 3~6 parts by weight of nano-size silicon dioxide and/or 2~5 parts by weight of aluminium hydroxide into a cellulose colloidal suspension comprising 4~7 parts by weight of cellulase and 80~150 parts by weight of microcrystalline cellulose, add 0.5~1.8 parts of 3-chlorine-2-hydroxyl-propyl triethyl ammonium chloride, stir at 60~80° C. and allow reaction for 18~30 min to obtain the solubilizer.

The ternary mixed solution according to the present invention comprises a biomass nanocellulose solubilizer and a dye, and abundant hydroxyl groups and carboxyl groups on its surface tightly bond with wood fiber, which improves the bonding force between dye molecules and wood. The ternary mixed solution according to the present invention also comprises bamboo leaf flavonoids and β-cyclodextrin and peppermint oil micro powders, which have a good coupling effect with the dye. The bamboo leaf has high application value since it contains many flavonoid compounds such as phenolic acid compounds, anthraquinone compounds, terpene lactones and alkaloids that have strong antibacterial and bactericidal activities. The β-cyclodextrin and peppermint oil micro powder has good health care effects and pleasant scent. Therefore, the mixed dye according to the present invention has good antibacterial and bactericidal effects, prolonging the useful life, and the pleasant scant makes the dye green and environmental-friendly.

More preferably, the preparation method of the β-cyclodextrin and peppermint oil micro powder: mix βcyclodextrin and peppermint oil in the proportion of 8-15:40-65 (by mass) at 20~30° C. so that peppermint oil is embedded in the cavity of β-cyclodextrin in molecules to form the β-cyclodextrin and peppermint oil micro powder as an inclusion compound.

The extraction method of the bamboo leaf flavonoids: select a hexennial or over bamboo from Mount Mogan in Deqing County (China), take dry leaves from its lower part, pulverize the leaves into 0.5~0.8 mm fine bamboo leaf powders. Dissolve the powders in a methanol solution with a mass fraction of 75-85%, carry out ultrasonic treatment for 28~35 min, add more methanol solution with a mass fraction of 75-85 wt % for dissolution, filter the resultant solution and take the filtrate as the liquid to be separated in column chromatography.

More preferably, the acid dye in Step (2) is a diazo dye compound:

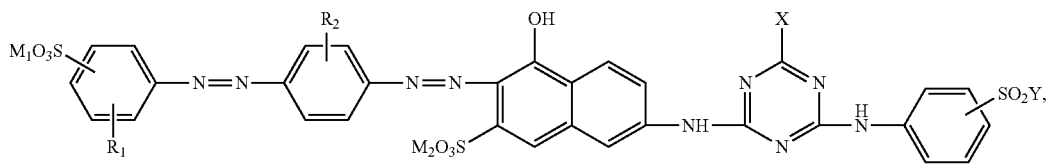

where,

M1 and M2 are hydrogen or alkali metals respectively;

$R_1$ is hydrogen, and $C_1$-$C_4$ is alkyl group or halogen;

$R_2$ is hydrogen;

X is halogen;

Y is —CH=$CH_2$.

The acid dye according to the present invention has good weather resistance and wear resistance when it is applied in the engineered wood according to the present invention.

Preferably, in the Step (1), make veneer blanks by rotary cutting or splicing, cut the veneer blanks into desired dimensions, and conduct carbonization thermal treatment at different carbonization temperatures to obtain veneers A.

More preferably, the carbonization thermal treatment includes: feed veneers into wood carbonization equipment, raise the temperature to 80° C.~90° C. and the relative humidity to 70%~80% quickly, keep the conditions for 2~4 h, raise the temperature in a stepwise way to 125° C.~135° C. at a rate of (30° C.-40° C.)/h, keep the conditions for 2~4 h, then raise the temperature in a stepwise way again to 175° C.~200° C. at a rate of (12° C.-18° C.)/h. Keep the conditions for 2~4 h at the highest temperature, cool the woods quickly to below 80° C. that is the temperature in the carbonization equipment by spraying atomized water, stop heating and spraying atomized water to end carbonization, allow the temperature to naturally fall to 40° C.~60° C., and take the woods out of the kiln.

Preferably, prior to Step (2), bleach the veneers A;

The bleaching includes the following steps:

(1) pretreatment: put the wood veneers into a sodium hydroxide with a pH value of 9~11 for 1~3 h pretreatment to obtain pretreated veneers;

(2) alkaline decolorization:

preparation of Solution A: Solution A is a mixture comprising the following substances with the corresponding mass concentrations: hydrogen peroxide, 4~7%; sodium silicate, 0.2~0.8%; ethylenediaminetetraacetic acid, 0.05~0.1%; sodium sulfate, 0.05~0.15%; magnesium sulfate, 0.05~0.1%; sodium hydroxide, 0.5~1%; ammonia water, 0.4~0.8%; water is the solvent;

pour Solution A into 55~65° C. water, adjust the pH to 9~11 with sodium hydroxide to obtain a temporary Solution A; put the pretreated veneers in the temporary Solution A for 2~4 h decolorization treatment, and raise the temperature slowly to 80~90° C. at a rate of 5~10° C./h during the treatment to obtain alkaline-decolorized veneers;

(3) acid decolorization:

preparation of Solution B: Solution B is a mixture comprising the following substances with the corresponding mass concentrations: sodium chlorate, 1~3%; sulfamic acid, 0.02~0.2%; oxalic acid, 0.5~1.5%; acetic acid, 0.1~0.5%; phosphoric acid, 0.3~1%; water is solvent;

pour Solution B into 45~55° C. water, adjust the pH to 4~6 with phosphoric acid to obtain a temporary Solution B; take the alkaline-decolorized veneers out of the Solution A, rinse the veneers and then put them in the temporary Solution B for 2~4 h decolorization treatment to obtain acid-decolorized veneers;

(4) cleaning and drying: take the acid-decolorized veneers out of the Solution B, soak the veneers in clean water for 1~2 h, and then dry.

Preferably, the toughening, fire retardation and dyeing by soaking in Step (2) includes heating treatment at a temperature of 80~95° C.

Preferably, the toughening, fire retardation and dyeing by soaking in Step (2) also includes ultrasonic vibration treatment with a vibration frequency of 1-3.5×104 Hz and a vibration time of 30-120 min.

Preferably, after the adhesive is taken out in Step D, add 5~10 parts of formaldehyde scavenger and 1~3 parts of curing agent during use of the modified MUF adhesive;

the preparation method of the formaldehyde scavenger is: pulverize 10~20 parts of urea, add 5~10 parts of melamine, 8~12 parts of p-Toluenesulfonyl hydrazide, 6~7 parts of aminosulfonic acid and 1~2 parts of nano-silicon dioxide, and stir them well.

Addition of a resin formaldehyde scavenger in the present invention further reduce the molar ratio of the urea and formaldehyde in urea-formaldehyde resin-based adhesives since the free urea and active hydroxymethyl compounds existing in the system can react with formaldehyde in the adhesive, significantly reducing the formaldehyde emission of the finished artificial boards.

More preferably, the preparation method of the curing agent: add 100 parts of water into a reaction kettle, start the kettle to begin stirring, raise the temperature to 40~50° C., add 20~30 parts of aluminium sulphate and 10~15 parts of p-Toluenesulfonyl hydrazide, dissolve them completely, cool to the room temperature, and discharge the material.

More preferably, the preparation method of the modified MUF adhesive also includes, post addition of the formaldehyde scavenger, add 6~9 parts of first composite regulator and 7~11 parts of second composite regulator in turn;

the first composite regulator is prepared by mixing methyltrioctylammonium bromide, glycerine and polytetrafluoroethylene in the proportion of 1:3-4:1-2 (by mass);

the second composite regulator is prepared by mixing diphenylamine, 2,6-di-tert-butyl and benzotriazole in the proportion of 1:2-4:1-3 (by mass).

The first composite regulator according to the present invention has outstanding dispersion, consistency regulation, anti-wear and wear resistance performance after mixing. The second composite regulator has anti-oxidation, smoothening and corrosion resistance effects.

To sum up, the present invention has the following beneficial effects:

1. the engineered wood prepared according to the present invention has wear resistance, weather resistance, high-efficiency fire retardation and smoke suppression performances;

2. the engineered wood prepared according to the present invention has the function of absorbing and decomposing formaldehyde on the surface, purifying the air and improving the environmental quality indicators. The formaldehyde scavenging efficiency is over 75% and the persistence of the formaldehyde scavenging effect is over 60%;

3. the coloring agent is weather-resistant and well compatible with water-based adhesives, easily penetrates but not easily vanishes, and a bioenvironmental protection dye is used, greatly reducing pollution. In addition, the function of fire retardation is included in the modified MUF adhesive to allow the modified MUF adhesive, the ternary mixed dye and the formaldehyde decomposing adhesive liquid to have a good mixing synergistic effect.

DETAILED DESCRIPTION OF THE INVENTION

Formula I of the ternary mixed solution prepared by mixing a biomass nanocellulose solubilizer, a fire retardant and an acid diazo dye compound solutions in the proportion of 1:25:300 (by mass);

the preparation of the biomass nanocellulose solubilizer: add 1 parts by weight of bamboo leaf flavonoids, 0.5 parts by weight of β-cyclodextrin and peppermint oil micro powders and 3 parts by weight of nano-size silicon dioxide and/or 5 parts by weight of aluminium hydroxide into a cellulose colloidal suspension comprising 4 parts by weight of cellulase and 150 parts by weight of microcrystalline cellulose. Add 0.5 parts of 3-chlorine-2-hydroxyl-propyl triethyl ammonium chloride, stir at 60° C. and allow reaction for 18 min to obtain the solubilizer.

the preparation method of the β-cyclodextrin and peppermint oil micro powder: mix β-cyclodextrin and peppermint oil in the proportion of 8:65 (by mass) at 20° C. so that peppermint oil is embedded in the cavity of β-cyclodextrin in molecules to form the β-cyclodextrin and peppermint oil micro powder as an inclusion compound;

the extraction method of the bamboo leaf flavonoids: select a hexennial or other bamboo from Mount Mogan in Deqing County (China) or some other desired location, take dry leaves from its lower part, pulverize the leaves into 0.5 mm fine bamboo leaf powders. Dissolve the powders in a methanol solution with a mass fraction of 75%, carry out ultrasonic treatment for 28 min, add more methanol solution with a mass fraction of 75 wt % for dissolution, filter the resultant solution and take the filtrate as the liquid to be separated in column chromatography.

Formula II of the ternary mixed solution is prepared by mixing a biomass nanocellulose solubilizer, a fire retardant and an acid diazo dye compound solutions in the proportion of 1:40:100 (by mass).

The preparation of the biomass nanocellulose solubilizer includes: add 1 parts by weight of bamboo leaf flavonoids, 0.5 parts by weight of β-cyclodextrin and peppermint oil micro powders and 6 parts by weight of nano-size silicon dioxide and/or 2 parts by weight of aluminium hydroxide into a cellulose colloidal suspension comprising 7 parts by weight of cellulase and 80 parts by weight of microcrystalline cellulose. Add 1.8 parts of 3-chlorine-2-hydroxyl-propyl triethyl ammonium chloride, stir at 80° C. and allow reaction for 30 min to obtain the solubilizer.

The preparation method of the β-cyclodextrin and peppermint oil micro powder includes: mix β-cyclodextrin and peppermint oil in the proportion of 15:40 (by mass) at 30° C. so that peppermint oil is embedded in the cavity of β-cyclodextrin in molecules to form the β-cyclodextrin and peppermint oil micro powder as an inclusion compound;

The extraction method of the bamboo leaf flavonoids include: select a hexennial or other bamboo from Mount Mogan in Deqing County (China) or some other appropriate location, take dry leaves from its lower part, pulverize the leaves into 0.8 mm fine bamboo leaf powders. Dissolve the powders in a methanol solution with a mass fraction of 85%, carry out ultrasonic treatment for 35 min, add more methanol solution with a mass fraction of 85 wt % for dissolution, filter the resultant solution and take the filtrate as the liquid to be separated in column chromatography.

Formula III of the ternary mixed solution includes preparing by mixing a biomass nanocellulose solubilizer, a fire retardant and an acid diazo dye compound solutions in the proportion of 1:30:200 (by mass). The preparation of the biomass nanocellulose solubilizer include: add 2 parts by weight of bamboo leaf flavonoids, 0.6 parts by weight of β-cyclodextrin and peppermint oil micro powders and 5 parts by weight of nano-size silicon dioxide and/or 3 parts by weight of aluminium hydroxide into a cellulose colloidal suspension comprising 6 parts by weight of cellulase and 120 parts by weight of microcrystalline cellulose. Add 0.9 parts of 3-chlorine-2-hydroxyl-propyl triethyl ammonium chloride, stir at 70° C. and allow reaction for 25 min to obtain the solubilizer.

The preparation method of the β-cyclodextrin and peppermint oil micro powder includes: mix β-cyclodextrin and peppermint oil in the proportion of 12:55 (by mass) at 25° C. so that peppermint oil is embedded in the cavity of β-cyclodextrin in molecules to form the β-cyclodextrin and peppermint oil micro powder as an inclusion compound;

The extraction method of the bamboo leaf flavonoids includes: select a hexennial or over bamboo from Mount Mogan in Deqing County (China), take dry leaves from its lower part, pulverize the leaves into 0.6 mm fine bamboo leaf powders. Dissolve the powders in a methanol solution with a mass fraction of 80%, carry out ultrasonic treatment for 30 min, add more methanol solution with a mass fraction of 80 wt % for dissolution, filter the resultant solution and take the filtrate as the liquid to be separated in column chromatography.

Embodiment I

The preparation method of the modified MUF adhesive includes:

A. feed 100 parts by weight of formaldehyde aqueous solution with a mass concentration of 36.5 wt %, 0.1 parts by weight of alkaline substance solution with a mass concentration of 30 wt % and 0.3 parts by weight of amino-terminated hyperbranched polymer PAMAM into a reaction kettle, and start the kettle to begin stirring; the alkaline substance is sodium hydroxide, potassium hydroxide, calcium hydroxide, barium hydroxide or ammonia water;

B. add 1 part of phosphonitrilic chloride trimer, raise the temperature to 50° C., allow the temperature to rise naturally to 75° C., add 35 parts of melamine, raise the temperature to 90° C., and allow them to react to obtain primary condensation polymers;

C. add 40 parts of melamine in the primary condensation polymers above, and add 0.6 parts of para toluene sulfonamide, to obtain second condensation polymers;

D. cool the second condensation polymers to 70° C., add 20 parts of urea, allow reaction for 8 min, cool to 30° C. and then take out the adhesive.

Embodiment II

The preparation method of the modified MUF adhesive includes:
A. feed 100 parts by weight of formaldehyde aqueous solution with a mass concentration of 37.4 wt %, 0.5 parts by weight of alkaline substance solution with a mass concentration of 50 wt % and 0.6 parts by weight of amino-terminated hyperbranched polymer PAMAM into a reaction kettle, and start the kettle to begin stirring; the alkaline substance is sodium hydroxide, potassium hydroxide, calcium hydroxide, barium hydroxide or ammonia water;
B. add 1 part of phosphonitrilic chloride trimer, raise the temperature to 55° C., allow the temperature to rise naturally to 85° C., add 55 parts of melamine, raise the temperature to 95° C., and allow them to react to obtain primary condensation polymers;
C. add 45 parts of melamine in the primary condensation polymers above, and add 0.9 parts of para toluene sulfonamide, to obtain second condensation polymers;
D. cool the second condensation polymers to 75° C., add 30 parts of urea, allow reaction for 12 min, cool to 50° C. and then take out the adhesive.

Embodiment III

The preparation method of the modified MUF adhesive includes:
A. feed 100 parts by weight of formaldehyde aqueous solution with a mass concentration of 36.9 wt %, 0.4 parts by weight of alkaline substance solution with a mass concentration of 40 wt % and 0.5 parts by weight of amino-terminated hyperbranched polymer PAMAM into a reaction kettle, and start the kettle to begin stirring; the alkaline substance is sodium hydroxide, potassium hydroxide, calcium hydroxide, barium hydroxide or ammonia water;
B. add 3 part of phosphonitrilic chloride trimer, raise the temperature to 53° C., allow the temperature to rise naturally to 80° C., add 45 parts of melamine, raise the temperature to 92° C., and allow them to react to obtain primary condensation polymers;
C. add 43 parts of melamine in the primary condensation polymers above, and add 0.8 parts of para toluene sulfonamide, to obtain second condensation polymers;
D. cool the second condensation polymers to 72° C., add 20~30 parts of urea, allow reaction for 9 min, cool to 40° C. and then take out the adhesive.

Embodiment IV

Most are the same as Embodiment I, but the difference is that, after the adhesive is taken out in Step D, add 5 parts of formaldehyde scavenger and 1 part of curing agent during use of the modified MUF adhesive. The preparation method of the formaldehyde scavenger includes: pulverize 10 parts of urea, add 5 parts of melamine, 8 parts of p-Toluenesulfonyl hydrazide, 6 parts of aminosulfonic acid and 1 part of nano-silicon dioxide, and stir them well.

The preparation method of the curing agent: add 100 parts of water into a reaction kettle includes, start the kettle to begin stirring, raise the temperature to 40° C., add 20 parts of aluminium sulphate and 15 parts of p-Toluenesulfonyl hydrazide, dissolve them completely, cool to the room temperature, and discharge the material.

The preparation method of the modified MUF adhesive also includes, post addition of the formaldehyde scavenger, add 6 parts of first composite regulator and 11 parts of second composite regulator in turn.

The first composite regulator is prepared by mixing methyltrioctylammonium bromide, glycerine and polytetrafluoroethylene in the proportion of 1:3:2 (by mass).

The second composite regulator is prepared by mixing diphenylamine, 2,6-di-tert-butyl and benzotriazole in the proportion of 1:2:3 (by mass).

Embodiment V

Most are the same as Embodiment II, but the difference is that, after the adhesive is taken out in Step D, add 5 parts of formaldehyde scavenger and 3 part of curing agent during use of the modified MUF adhesive.

The preparation method of the formaldehyde scavenger includes: pulverize 20 parts of urea, add 10 parts of melamine, 12 parts of p-Toluenesulfonyl hydrazide, 7 parts of aminosulfonic acid and 2 part of nano-silicon dioxide, and stir them well.

The preparation method of the curing agent includes: add 100 parts of water into a reaction kettle, start the kettle to begin stirring, raise the temperature to 50° C., add 30 parts of aluminium sulphate and 10 parts of p-Toluenesulfonyl hydrazide. Dissolve them completely, cool to the room temperature, and discharge the material.

The preparation method of the modified MUF adhesive also includes, post addition of the formaldehyde scavenger, add 9 parts of first composite regulator and 7 parts of second composite regulator in turn.

The first composite regulator is prepared by mixing methyltrioctylammonium bromide, glycerine and polytetrafluoroethylene in the proportion of 1:4:1 (by mass).

The second composite regulator is prepared by mixing diphenylamine, 2,6-di-tert-butyl and benzotriazole in the proportion of 1:4:1 (by mass).

Embodiment VI

Most are the same as Embodiment III, but the difference is that, after the adhesive is taken out in Step D, add 6 parts of formaldehyde scavenger and 2 part of curing agent during use of the modified MUF adhesive.

The preparation method of the formaldehyde scavenger: pulverize 15 parts of urea, add 8 parts of melamine, 11 parts of p-Toluenesulfonyl hydrazide, 6.5 parts of aminosulfonic acid and 1.2 part of nano-silicon dioxide, and stir them well.

The preparation method of the curing agent includes: add 100 parts of water into a reaction kettle, start the kettle to begin stirring, raise the temperature to 45° C., add 25 parts of aluminium sulphate and 12 parts of p-Toluenesulfonyl hydrazide. Dissolve them completely, cool to the room temperature, and discharge the material.

The preparation method of the modified MUF adhesive also includes, post addition of the formaldehyde scavenger, add 8 parts of first composite regulator and 7 parts of second composite regulator in turn.

The first composite regulator is prepared by mixing methyltrioctylammonium bromide, glycerine and polytetrafluoroethylene in the proportion of 1:3.4:1.2 (by mass).

The second composite regulator is prepared by mixing diphenylamine, 2,6-di-tert-butyl and benzotriazole in the proportion of 1:2.4:1.3 (by mass).

Embodiment VII

The method for preparing functional engineered wood includes the following steps:
(1) make veneer blanks by rotary cutting or splicing, and cut the veneer blanks into desired dimensions to obtain veneers A;
(2) soak the veneers A in a ternary mixed solution of a biomass nanocellulose solubilizer, a fire retardant and an acid dye for toughening, fire retardation and dyeing to obtain veneers B, wherein the toughening, fire retardation and dyeing by soaking includes heating treatment at a temperature of 80° C., and the ternary mixed solution is formulated and prepared according to Formula I of the ternary mixed solution;
Wherein, the acid dye is a diazo compound:

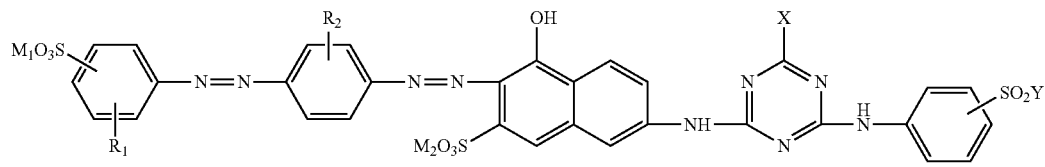

M1 and M2 are hydrogen or alkali metals respectively;
$R_1$ is hydrogen, and $C_1$-$C_4$ is alkyl group or halogen; $R_2$ is hydrogen;
X is halogen;
Y is —CH=$CH_2$;
(3) add a formaldehyde decomposing powder into a modified MUF adhesive, mix them up, coat the veneers B with the mixture to obtain veneers C;
The formaldehyde decomposing powder comprises chitin and nano-silicon slices;
(4) assemble and cold-press the veneers C to obtain flitches D, and saw the veneers D into desired patterns and dimensions to obtain finished products.

Embodiment VIII

Most are the same as Embodiment VII, but the difference is that the toughening, fire retardation and dyeing by soaking includes heating treatment at a temperature of 88° C.; the formaldehyde decomposing powder in Step (3) comprises chitin, nano-silicon slices and tourmaline powders; the tourmaline powder is 2 wt % by weight of the formaldehyde decomposing powder.

Embodiment IX

Most are the same as Embodiment VII, but the difference is that the toughening, fire retardation and dyeing by soaking includes heating treatment at a temperature of 95° C.; the formaldehyde decomposing powder in Step (3) comprises chitin, nano-silicon slices and tourmaline powders; the tourmaline powder is 5 wt % by weight of the formaldehyde decomposing powder.

Embodiment X

Most are the same as Embodiment VII, but the difference is that, in the Step (1), make veneer blanks by rotary cutting or splicing, cut the veneer blanks into desired dimensions, and conduct carbonization thermal treatment at different carbonization temperatures to obtain veneers A.

The carbonization thermal treatment includes: feed veneers into wood carbonization equipment, raise the temperature to 80° C. and the relative humidity to 70% quickly. Keep the conditions for 2 h, raise the temperature in a stepwise way to 125° C. at a rate of 30° C./h, keep the conditions for 2 h, then raise the temperature in a stepwise way again to 175° C. at a rate of 12° C./h. Keep the conditions for 2 h at the highest temperature, cool the woods quickly to below 80° C. that is the temperature in the carbonization equipment by spraying atomized water, stop heating and spraying atomized water to end carbonization, allow the temperature to naturally fall to 40° C., and take the woods out of the kiln.

Prior to Step (2), bleach the veneers A;

the bleaching includes the following steps:
(1) pretreatment: put the wood veneers into a sodium hydroxide with a pH value of 9 for 1 h pretreatment to obtain pretreated veneers;
(2) alkaline decolorization:
Preparation of Solution A: Solution A is a mixture comprising the following substances with the corresponding mass concentrations: hydrogen peroxide, 4%; sodium silicate, 0.2%; ethylenediaminetetraacetic acid, 0.05%; sodium sulfate, 0.05%; magnesium sulfate, 0.05%; sodium hydroxide, 0.5%; ammonia water, 0.8%; water is the solvent;
pour Solution A into 55° C. water, adjust the pH to 9 with sodium hydroxide to obtain a temporary Solution A; put the pretreated veneers in the temporary Solution A for 2 h decolorization treatment, and raise the temperature slowly to 80° C. at a rate of 5° C./h during the treatment to obtain alkaline-decolorized veneers;
(3) acid decolorization:
preparation of Solution B: Solution B is a mixture comprising the following substances with the corresponding mass concentrations: sodium chlorate, 1%; sulfamic acid, 0.02%; oxalic acid, 0.5%; acetic acid, 0.1%; phosphoric acid, 1%; water is solvent;
pour Solution B into 45° C. water, adjust the pH to 4 with phosphoric acid to obtain a temporary Solution B; take the alkaline-decolorized veneers out of the Solution A, rinse the veneers and then put them in the temporary Solution B for 2 h decolorization treatment to obtain acid-decolorized veneers;
(4) cleaning and drying: take the acid-decolorized veneers out of the Solution B, soak the veneers in clean water for 1 h, and then dry.

The toughening, fire retardation and dyeing by soaking in Step (2) also includes ultrasonic vibration treatment with a vibration frequency of $1 \times 10^4$ Hz and a vibration time of 30 min.

Embodiment XI

Most are the same as Embodiment VIII, but the difference is that, in the Step (1), make veneer blanks by rotary cutting or splicing, cut the veneer blanks into desired dimensions, and conduct carbonization thermal treatment at different carbonization temperatures to obtain veneers A.

The carbonization thermal treatment includes: feed veneers into wood carbonization equipment, raise the temperature to 90° C. and the relative humidity to 80% quickly, keep the conditions for 4 h, raise the temperature in a stepwise way to 135° C. at a rate of 40° C./h, keep the conditions for 4 h, then raise the temperature in a stepwise way again to 200° C. at a rate of 18° C./h. Keep the conditions for 2~4 h at the highest temperature, cool the woods quickly to below 80° C. that is the temperature in the carbonization equipment by spraying atomized water, stop heating and spraying atomized water to end carbonization, allow the temperature to naturally fall to 60° C., and take the woods out of the kiln.

Prior to Step (2), bleach the veneers A;
the bleaching includes the following steps:
(1) pretreatment: put the wood veneers into a sodium hydroxide with a pH value of 11 for 1~3 h pretreatment to obtain pretreated veneers;
(2) alkaline decolorization:
Preparation of Solution A: Solution A is a mixture comprising the following substances with the corresponding mass concentrations: hydrogen peroxide, 7%; sodium silicate, 0.8%; ethylenediaminetetraacetic acid, 0.1%; sodium sulfate, 0.15%; magnesium sulfate, 0.1%; sodium hydroxide, 1%; ammonia water, 0.4%; water is the solvent;
Pour Solution A into 65° C. water, adjust the pH to 11 with sodium hydroxide to obtain a temporary Solution A; put the pretreated veneers in the temporary Solution A for 4 h decolorization treatment, and raise the temperature slowly to 90° C. at a rate of 10° C./h during the treatment to obtain alkaline-decolorized veneers;
(3) acid decolorization:
preparation of Solution B: Solution B is a mixture comprising the following substances with the corresponding mass concentrations: sodium chlorate, 3%; sulfamic acid, 0.2%; oxalic acid, 1.5%; acetic acid, 0.5%; phosphoric acid, 0.3%; water is solvent;
pour Solution B into 55° C. water, adjust the pH to 6 with phosphoric acid to obtain a temporary Solution B; take the alkaline-decolorized veneers out of the Solution A, rinse the veneers and then put them in the temporary Solution B for 4 h decolorization treatment to obtain acid-decolorized veneers;
(4) cleaning and drying: take the acid-decolorized veneers out of the Solution B, soak the veneers in clean water for 2 h, and then dry.

The toughening, fire retardation and dyeing by soaking in Step (2) also includes ultrasonic vibration treatment with a vibration frequency of $3.5 \times 10^4$ Hz and a vibration time of 120 min.

Embodiment XII

Most are the same as Embodiment IX, but the difference is that, in the Step (1), make veneer blanks by rotary cutting or splicing, cut the veneer blanks into desired dimensions, and conduct carbonization thermal treatment at different carbonization temperatures to obtain veneers A.

The carbonization thermal treatment includes: feed veneers into wood carbonization equipment, raise the temperature to 85° C. and the relative humidity to 75% quickly, keep the conditions for 3 h, raise the temperature in a stepwise way to 128° C. at a rate of 35° C./h, keep the conditions for 3 h, then raise the temperature in a stepwise way again to 185° C. at a rate of 16° C./h. Keep the conditions for 3 h at the highest temperature, cool the woods quickly to below 80° C. that is the temperature in the carbonization equipment by spraying atomized water, stop heating and spraying atomized water to end carbonization, allow the temperature to naturally fall to 50° C., and take the woods out of the kiln.

Prior to Step (2), bleach the veneers A;
The bleaching includes the following steps:
(1) treatment: put the wood veneers into a sodium hydroxide with a pH value of 10 for 2 h pretreatment to obtain pretreated veneers;
(2) alkaline decolorization:
Preparation of Solution A: Solution A is a mixture comprising the following substances with the corresponding mass concentrations: hydrogen peroxide, 5%; sodium silicate, 0.6%; ethylenediaminetetraacetic acid, 0.08%; sodium sulfate, 0.08%; magnesium sulfate, 0.07%; sodium hydroxide, 0.5~1%; ammonia water, 0.6%; water is the solvent;
pour Solution A into 60° C. water, adjust the pH to 10 with sodium hydroxide to obtain a temporary Solution A; put the pretreated veneers in the temporary Solution A for 3 h decolorization treatment, and raise the temperature slowly to 85° C. at a rate of 8° C./h during the treatment to obtain alkaline-decolorized veneers;
(3) acid decolorization:
preparation of Solution B: Solution B is a mixture comprising the following substances with the corresponding mass concentrations: sodium chlorate, 2%; sulfamic acid, 0.12%; oxalic acid, 0.8%; acetic acid, 0.4%; phosphoric acid, 0.6%; water is solvent;
pour Solution B into 49° C. water, adjust the pH to 5 with phosphoric acid to obtain a temporary Solution B; take the alkaline-decolorized veneers out of the Solution A, rinse the veneers and then put them in the temporary Solution B for 3 h decolorization treatment to obtain acid-decolorized veneers;
(4) cleaning and drying: take the acid-decolorized veneers out of the Solution B, soak the veneers in clean water for 1.2 h, and then dry.

The toughening, fire retardation and dyeing by soaking in Step (2) also includes ultrasonic vibration treatment with a vibration frequency of $2.5 \times 10^4$ Hz and a vibration time of 90 min.

The formaldehyde emission limit of the finished functional engineered wood is less than 0.2 mg/L, up to the Japanese standard F☆☆☆☆; the antibacterial rate is greater than or equal to 90%; the surface wear resistance is less than or equal to 0.08 g/100 r; the surface wear resistance complies with GB/T18103-2013. The formaldehyde scavenging efficiency of the prepared engineered wood is over 75% and the persistence of the formaldehyde scavenging effect is over 60%.

The embodiments are intended only for describing the present invention but not to limit the present invention. Those skilled in the field may make modifications that will have no creative contribution to the embodiments after reading the specification, and the modifications are under the protection of the patent law provided they are within the scope of the claims of the present invention.

What is claimed is:
1. A method for preparing functional engineered wood, characterized in that, including the following steps:
(1) make veneer blanks by rotary cutting or splicing, and cut the veneer blanks into desired dimensions to obtain veneers A;
(2) soak the veneers A in a ternary mixed solution of a biomass nanocellulose solubilizer, a fire retardant and an acid dye for toughening, fire retardation and dyeing to obtain veneers B;
(3) add a formaldehyde decomposing powder into a modified melamine/urea/formaldehyde adhesive, mix them up, coat the veneers B with the mixture to obtain veneers C;

(4) assemble and cold-press the veneers C to obtain veneers D, and saw the veneers D into desired patterns and dimensions to obtain finished products.

2. The method for preparing functional engineered wood as claimed in claim 1, characterized in that the preparation method of the modified MUF adhesive in Step (3) is as below:
   A. feed 100 parts by weight of formaldehyde aqueous solution with a mass concentration of 36.5-37.4 wt %, 0.1~0.5 parts by weight of alkaline substance solution with a mass concentration of 30-50 wt % and 0.3~0.6 parts by weight of amino-terminated hyperbranched polymer PAMAM into a reaction kettle, and start the kettle to begin stirring;
   B. add 1 to 4 parts by weights of phosphonitrilic chloride trimer, raise the temperature to 50 to 55° C., allow the temperature to rise naturally to 75 to 85° C., add 35 to 55 parts by weight of melamine, raise the temperature between 90 to 95° C., and allow them to react to obtain primary condensation polymers;
   C. add 40 to 45 parts of melamine in the primary condensation polymers above, and add 0.6 to 0.9 parts of para toluene sulfonamide, to obtain second condensation polymers;
   D. cool the second condensation polymers to 70 to 75° C., add 20 to 30 parts of urea, allow reaction for 8 to 12 min, cool to 30 to 50° C. and then take out the adhesive.

3. The method for preparing functional engineered wood as claimed in claim 2, characterized in that, after the adhesive is taken out in Step D, add 5 to 10 parts of formaldehyde scavenger and 1 to 3 parts of curing agent during use of the modified MUF adhesive;
   the preparation method of the formaldehyde scavenger includes:
   pulverizing 10 to 20 parts of urea,
   adding 5 to 10 parts of melamine, 8 to 12 parts of p-Toluenesulfonyl hydrazide, 6 to 7 parts of aminosulfonic acid and 1 to 2 parts of nano-silicon dioxide, and
   stir them well.

4. The method for preparing functional engineered wood as claimed in claim 3, characterized in that the preparation method of the curing agent: adding 100 parts of water into a reaction kettle, starting the kettle to begin stirring, raising the temperature to 40 to 50° C., adding 20 to 30 parts of aluminum sulphate and 10 to 15 parts of p-Toluenesulfonyl hydrazide, dissolving them completely, cooling to room temperature, and discharging the material.

5. The method for preparing functional engineered wood as claimed in claim 1, characterized in that the formaldehyde decomposing powder in Step (3) comprises chitin, nano-silicon slices and tourmaline powders; the tourmaline powder is 0 to 5 wt % by weight of the formaldehyde decomposing powder.

6. The method for preparing functional engineered wood as claimed in claim 1, characterized in that the ternary mixed solution in Step (2) is prepared by mixing a biomass nanocellulose solubilizer, a fire retardant and an acid diazo dye compound solutions in the proportion of 1:25 to 40:100 to 300 (by mass);
   the preparation of the biomass nanocellulose solubilizer:
   add 1 to 3 parts by weight of bamboo leaf flavonoids, 0.5 to 0.8 parts by weight of β-cyclodextrin and peppermint oil micro powders and 3 to 6 parts by weight of nano-size silicon dioxide and/or 2 to 5 parts by weight of aluminium hydroxide into a cellulose colloidal suspension comprising 4 to 7 parts by weight of cellulase and 80 to 150 parts by weight of microcrystalline cellulose,
   add 0.5 to 1.8 parts of 3-chlorine-2-hydroxyl-propyl triethyl ammonium chloride, stir at 60 to 80° C. and allow reaction for 18 to 30 minute to obtain the solubilizer.

7. The method for preparing functional engineered wood as claimed in claim 6, characterized in that the preparation method of the β-cyclodextrin and peppermint oil micro powder is that: mix β-cyclodextrin and peppermint oil in the proportion of 8 to 15:40 to 65 (by mass) at 20 to 30° C. so that peppermint oil is embedded in the cavity of β-cyclodextrin in molecules to form the β-cyclodextrin and peppermint oil micro powder as an inclusion compound,
   wherein the bamboo leaf flavonoids are extracted by selecting a hexennial or other bamboo, taking dry leaves from its lower part, pulverizing the leaves into 0.5 to 0.8 mm fine bamboo leaf powders, dissolving the powders in a methanol solution with a mass fraction of 75-85%, carrying out ultrasonic treatment for 28 to 35 minutes, adding more methanol solution with a mass fraction of 75 to 85 wt % for dissolution, filtering the resultant solution and taking the filtrate as the liquid to be separated in column chromatography.

8. The method for preparing functional engineered wood as claimed in claim 1, characterized in that, prior to Step (2), bleach the veneers A;
   the bleaching includes the following steps:
   (1) pretreatment, wherein the wood veneers are put into a sodium hydroxide with a pH value of 9~11 for 1~3 h pretreatment to obtain pretreated veneers;
   (2) alkaline decoloration, wherein a solution A is prepared mixing the following substances with the corresponding mass concentrations: hydrogen peroxide, 4 to 7%; sodium silicate, 0.2 to 0.8%; ethylenediaminetetraacetic acid, 0.05 to 0.1%; sodium sulfate, 0.05 to 0.15%; magnesium sulfate, 0.05 to 0.1%; sodium hydroxide, 0.5 to 1%; ammonia water, 0.4 to 0.8%; wherein water is the solvent;
   pour Solution A into 55~65° C. water, adjust the pH to 9 to 11 with sodium hydroxide to obtain a temporary Solution A; put the pretreated veneers in the temporary Solution A for 2 to 4 h decolorization treatment, and raise the temperature slowly to 80 to 90° C. at a rate of 5 to 10° C./h during the treatment to obtain alkaline-decolorized veneers;
   (3) acid decolorization, where a Solution B is prepared and includes mixing the following substances with the corresponding mass concentrations: sodium chlorate, 1 to 3%; sulfamic acid, 0.02 to 0.2%; oxalic acid, 0.5 to 1.5%; acetic acid, 0.1 to 0.5%; phosphoric acid, 0.3 to 1%; wherein water is solvent;
   the method further including pouring Solution B into 45 to 55° C. water, adjusting the pH to between 4 and 6 with phosphoric acid to obtain a temporary Solution B; take the alkaline-decolorized veneers out of the Solution A, rinse the veneers and then put them in the temporary Solution B for 2 to 4 hours for decolorization treatment to obtain acid-decolorized veneers;
   (4) the method further including cleaning and drying, that includes taking the acid-decolorized veneers out of the Solution B, soaking the veneers in clean water for 1 to 2 hours, and then drying the veneers.

9. The method for preparing functional engineered wood as claimed in claim 1, characterized in that, in the Step (1), further including making veneer blanks by rotary cutting or splicing, cut the veneer blanks into desired dimensions, and conduct carbonization thermal treatment at different carbonization temperatures to obtain veneers A.

10. The method for preparing functional engineered wood as claimed in claim 1, characterized in that the acid dye is a diazo compound:

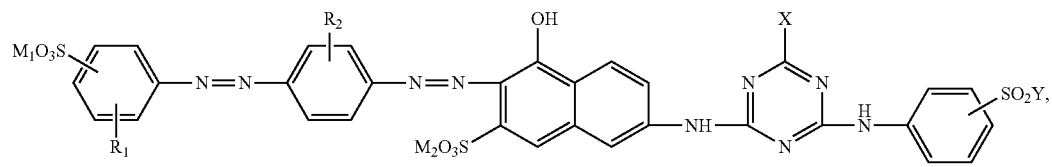
where,
M1 and M2 are hydrogen or alkali metals respectively;
$R_1$ is hydrogen, and $C_1$-$C_4$ is alkyl group or halogen;
$R_2$ is hydrogen;
X is halogen;
Y is —CH=$CH_2$.
* * * * *